(12) United States Patent
Williams

(10) Patent No.: US 9,579,829 B2
(45) Date of Patent: Feb. 28, 2017

(54) METHOD FOR MANUFACTURING AN OPTICAL ELEMENT

(71) Applicant: Vadient Optics, LLC, Beaverton, OR (US)

(72) Inventor: George Williams, Portland, OR (US)

(73) Assignee: Vadient Optics, LLC, Beaverton, OR (US)

( * ) Notice: Subject to any disclaimer, the term of this patent is extended or adjusted under 35 U.S.C. 154(b) by 73 days.

(21) Appl. No.: 14/554,399

(22) Filed: Nov. 26, 2014

(65) Prior Publication Data

US 2015/0343673 A1 Dec. 3, 2015

Related U.S. Application Data

(63) Continuation-in-part of application No. 14/293,574, filed on Jun. 2, 2014, now Pat. No. 9,442,344.

(51) Int. Cl.
*B29C 39/02* (2006.01)
*B29C 39/12* (2006.01)
(Continued)

(52) U.S. Cl.
CPC ........ *B29C 39/026* (2013.01); *B29C 33/3842* (2013.01); *B29C 39/021* (2013.01); *B29C 39/12* (2013.01); *B29C 67/0059* (2013.01); *B29D 11/0048* (2013.01); *B29D 11/00663* (2013.01); *B33Y 10/00* (2014.12); *B33Y 80/00* (2014.12); *B29C 41/36* (2013.01);
(Continued)

(58) Field of Classification Search
CPC .............................. B29C 39/026; B29C 39/12
See application file for complete search history.

(56) References Cited

U.S. PATENT DOCUMENTS

| 5,498,444 A | 3/1996 | Hayes |
| 5,707,684 A | 1/1998 | Hayes et al. |

(Continued)

FOREIGN PATENT DOCUMENTS

| EP | 2412767 A1 | 2/2012 |
| EP | 2474404 A1 | 6/2012 |

(Continued)

OTHER PUBLICATIONS

Richard Chartoff, et al., Functionally Graded Polymer Matrix Nano-Composites by Solid Freeform Fabrciation: A Preliminary Report, Solid Freeform (SFF) symposium, [online], 2003, pp. 385-391, [retrieved on Apr. 23, 2015]. from the Internet: <http://sffsymposium.engr.utexas.edu/Manuscripts/2003/2003-36-Chartoff.pdf>.

(Continued)

*Primary Examiner* — Daniel Petkovsek

(57) ABSTRACT

A method to manufacture optics and optical subsystems. In one aspect, a method to manufacture an optical-element in accordance with the present disclosure comprise the steps of: Printing at least a part of a mold with an additive manufacturing printer. Optically figuring the mold to the specifications of the desired optical-element. Printing a nanocomposite-ink into the mold. Selectively, curing the nanocomposite-ink. Repeating at least the steps of deposition of the nanocomposite-ink and selective curing, until the mold is sufficiently filled and cured. Optionally, releasing the optical-element from the mold.

23 Claims, 6 Drawing Sheets

(51) Int. Cl.
  *B29C 33/38* (2006.01)
  *B29D 11/00* (2006.01)
  *B29C 67/00* (2006.01)
  *B33Y 80/00* (2015.01)
  *B33Y 10/00* (2015.01)
  *B29L 11/00* (2006.01)
  *B29L 31/00* (2006.01)
  *B29C 41/36* (2006.01)

(52) U.S. Cl.
  CPC .... *B29L 2011/00* (2013.01); *B29L 2011/0083* (2013.01); *B29L 2031/756* (2013.01)

(56) References Cited

U.S. PATENT DOCUMENTS

| | | |
|---|---|---|
| 5,800,000 A | 9/1998 | Shockley |
| 5,807,906 A | 9/1998 | Bonvallot et al. |
| 6,593,415 B2 | 7/2003 | Koike et al. |
| 6,656,990 B2 | 12/2003 | Shustack et al. |
| 6,805,902 B1 | 10/2004 | Hayes |
| 6,836,371 B2 | 12/2004 | Lai et al. |
| 6,934,088 B2 | 8/2005 | Lai et al. |
| 6,976,641 B2 | 12/2005 | Lai et al. |
| 7,046,439 B2 | 5/2006 | Kaminsky et al. |
| 7,420,743 B2 | 9/2008 | Lai et al. |
| 7,473,721 B2 | 1/2009 | Harada et al. |
| 7,918,555 B2 | 4/2011 | Sverdrup et al. |
| 9,308,731 B2 * | 4/2016 | Williams .......... B41J 2/175 |
| 2013/0286073 A1 * | 10/2013 | Blessing .......... B29D 11/00 347/14 |
| 2015/0021528 A1 | 1/2015 | Chartoff et al. |
| 2015/0023643 A1 | 1/2015 | Chartoff et al. |
| 2016/0023375 A1 * | 1/2016 | Uram .......... B29C 39/36 264/133 |
| 2016/0231518 A1 * | 8/2016 | Stiles .......... G02B 6/4214 |

FOREIGN PATENT DOCUMENTS

| | | |
|---|---|---|
| EP | 2469309 B1 | 8/2013 |
| EP | 2392473 B1 | 9/2013 |

OTHER PUBLICATIONS

Richard Chartoff, et al., Polymer Matrix Nanocomposites by Inkjet Printing, Solid Freeform (SFF) symposium, [online], 2005, pp. 174-183, [retrieved on Apr. 23, 2015]. from the Internet: <http://sffsymposium.engr.utexas.edu/Manuscripts/2005/2005-16-Chartoff.pdf>.

* cited by examiner

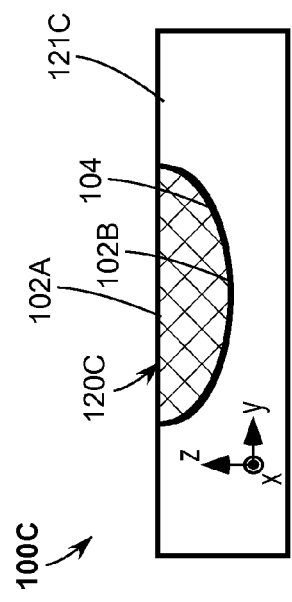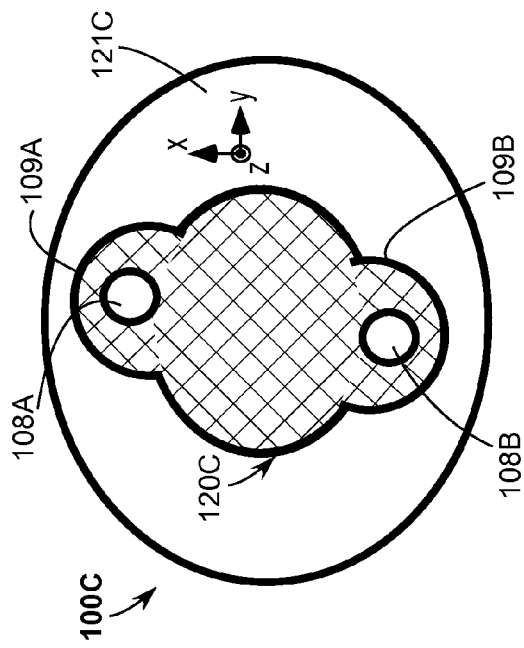
FIG. 4C  FIG. 4D
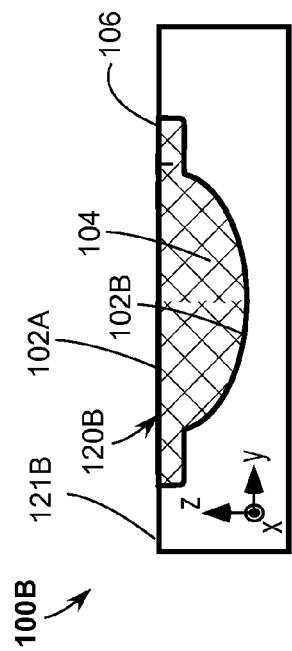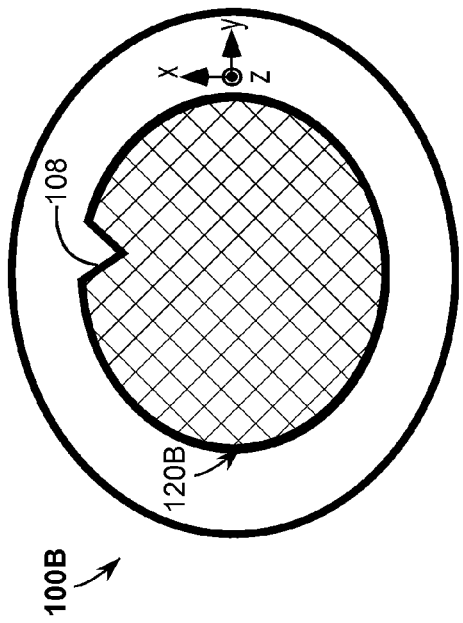
FIG. 4A  FIG. 4B

US 9,579,829 B2

METHOD FOR MANUFACTURING AN OPTICAL ELEMENT

RELATED APPLICATIONS

The application is a continuation-in-part of U.S. patent application Ser. No. 14/293,574 filed on Jul. 2, 2014.

TECHNICAL FIELD OF THE DISCLOSURE

The present disclosure relates in general to manufacturing optical elements and optical subsystems. The disclosure relates in particular to ink-jet printing optics within 3D printed releasable molds.

DISCUSSION OF BACKGROUND ART

A variety of manufacturing techniques exist for manufacturing optics. Traditional techniques, still widely in use today, involve grinding and polishing of optics with abrasive particles. Glass blanks are created via grinding, molding, or machining glass to roughly obtain the same shape, slightly greater in size, of the desired final optic. The blank or multiple blanks are mounted to a top or bottom polishing block, the polishing blocks shaped matching the desired optic shape. The blocks are typically mechanized with the bottom block typically rotating and the top-block moving across the bottom-block with an actuated arm. Slurry comprising of abrasive particles and water is continually added. As the lens goes through several stages of polishing, the grit size is reduced, until the resultant shape and surface finish is obtained. Unless a single optic is blocked, this technique is generally limited to planar, convex, and concave surfaces on circularly symmetric optic.

Other known techniques, which allow more complex surfaces and shapes include diamond-disc shaping, CNC machining with single-point diamond shaping, glass molding, polymer molding and magneto rheological figuring (MRF). This application relates to another approach.

SUMMARY OF THE DISCLOSURE

The present disclosure is directed to methods to manufacture optics and optical subsystems. In one aspect, a method to manufacture an optical-element in accordance with the present disclosure comprises the steps of: Printing at least a portion of a mold with an additive material printer. Optionally figuring the mold to the specifications of the desired optical-element. Depositing a nanocomposite-ink into the mold. Selectively, curing the nanocomposite-ink. Repeating at least the steps of depositing and selectively curing the nanocomposite-ink until the mold is sufficiently filled and cured. Last, optionally, removing at least a part of the mold from the optical-element.

BRIEF DESCRIPTION OF THE DRAWINGS

The accompanying drawings, which are incorporated in and constitute a part of the specification, schematically illustrate preferred embodiments of the present disclosure, and together with the general description given above and the detailed description of preferred methods and embodiment given below, serve to explain principles of the present disclosure.

FIG. 2A is a cross-section view, schematically illustrating deposition of a first nanocomposite-ink at a voxel on a.

FIG. 4A is a cross-section view schematically illustrating the optical element wherein the optical element comprises a flange and a rotational alignment feature.

FIG. 4B is a plan view of that shown in FIG. 4A

FIG. 4C is a cross-section view schematically illustrating the optical-element wherein the optical element has tabs with thru-holes for mounting.

FIG. 4D is a plan view of that shown in FIG. 4C.

DETAILED DESCRIPTION OF THE DISCLOSURE

Figure 1A:
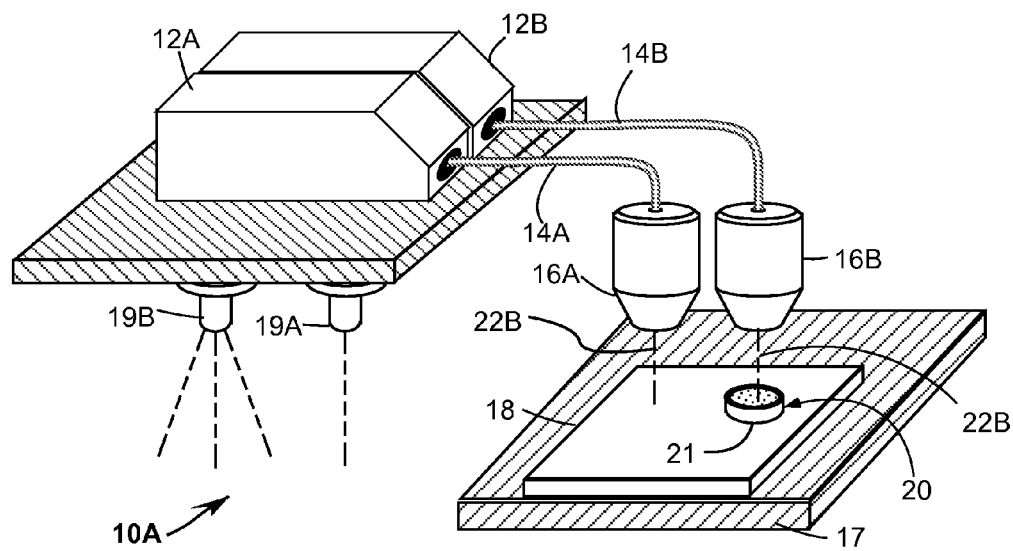
FIG. 1A is a perspective view schematically illustrating a two printer-head optical printing apparatus for manufacture of optical-elements.

Referring now to the drawings, wherein like components are designated by like reference numerals. Drawings are characterized by Cartesian (mutually perpendicular) axes x, y, and, z with the z-axis, although anyone skilled in the art can transform the axis to other coordinates or topologies. When referring to an optical-element, the z-axis refers generally to the direction of light propagation, and x and y being transverse axes. Methods of manufacture and optical-elements are described further herein below.

A method for manufacturing optics and optical subsystems comprise the following steps: Printing a mold with a 3-dimensional printer. Figuring the mold to the specifications of the desired optical-element. Depositing nanocomposite-ink into the mold. Selectively, curing the nanocomposite-ink. Repeating deposition of the nanocomposite-ink and selective curing until the mold is sufficiently filled and cured. Optionally, releasing the optical-element from the mold or removing at least a portion of the mold from the optical-element.

The mold can be designed in 3-dimensional software, the design based on the desired optical-element. The optical surfaces of the mold are critical areas which may require tolerance above what 3D-printing resolution provides. For instance, a reflective internal surface may require surface flatness or conformance less than a micron. For such surfaces, optical inserts or post processing of the mold can be implemented. Such post processing, referred herein generally as figuring, is described in further detail below. Optical inserts are pre-made components which have the same surface shape and specification as the surface of the optical-element. Such inserts can be incorporated within the mold with mounting features, or be printhead within mold thereby leaving the negative surface impression on the optical-element after deposition of the nanocomposite-ink. Generally, the optical-inserts are removed after deposition and curing of the nanocomposite-ink, but optical-inserts can be incorporated within the optical-element. The optical-inserts can be made from a variety of materials such as metals, glasses, or polymers.

In addition to the optical surfaces of the optical-element, the mold can include mounting, alignment, break-lines, structural and functional features. Such features can be designed for incorporation within the mold material or the optical-element. Mounting features include flanges, slots, holes, and threading. Similarly, alignment features include standoff, pins, and other such protrusions to aid alignment of the optical-element with other apparatus. Break-lines, which are either thin or perforated paths, can be incorporated in the mold to ease removal of at least a portion of the mold from the optical-element. Structural features such as casing or ribbing provide integrated packaging and stress reduction. For areas that will shape optical surfaces, ribbing of the backside of surface can provide extra stability and allow reduced material thickness, thereby reducing potential shrinkage of the mold. Features such as gears, latches, living hinges, internal tubing and capillaries provide functionality of the mold for movement, assembly. Internal tubing allows integrated air or liquid transport.

For optical-elements which require air-spacing, the mold can be designed with sacrificial areas. The sacrificial areas can be removed either mechanically, removal eased by included break-lines, or the sacrificial areas can be printed in a dissolvable material, the solvent introduced via integrated tubing or other opening in the mold.

In general, the mold can be made by using any commercially available additive manufacturing printer, also referred to in the art as 3D printing. One preferred material for the mold is plastic and thus a preferred printer is capable of printing plastic or plastic-like materials, although any printable material can be used. 3D-printer technologies include extrusion such as fused deposition modeling (FDM). Granular 3D-printing technology includes selective heat sintering (SHS), selective laser sintering (SLS), wherein particles are fused in a powder bed. Photopolymerization is a technique in which liquid polymer or resin is cured by photo exposure. Such additive manufacturing printers are available from a variety of manufacturers such as 3DSystems Inc. of Rock Hill, S.C., EnvisiontTEC, Inc. of Dearborn, Mich., and Stratasys Inc. of Minneapolis, Minn. Hybrid approaches include plaster-based printing wherein a binder is inkjet deposited onto granular material in a powder bed and then cured. One such hybridized material printer is the HP Multi Jet Fusion™ available from Hewlett Packard of Palo Alto, Calif. Currently 3D printing processes have spatial resolution in the micron range. Such resolution is sufficient for surface qualities of that needed for general illumination and low-end imaging applications. For optical surfaces with tolerances beyond the printing capability, the aforementioned optical inserts or figuring, described below, must be implemented.

Figuring of the optical surfaces of the mold can be accomplished with a variety of techniques. Nonlimiting examples of figuring techniques include laser ablation, chemical etching, electric discharge machining (EDM), computer numerical control (CNC), polishing, and stamping. Laser ablation removes material from the mold with short pulses. Chemical etching can implement photolithography techniques to selectively remove material from the mold. Stamping can be performed by pressing the positive optical surface shape onto the optical-element in the desired location by force, ultrasonic, heat or some combination thereof. Stamping can also include imprinting of patterns onto the mold surface. For instance, a diffractive pattern can be imprinted onto the surface of the optical-element. After the mold is complete, the mold can optional be treated with a releasing agent, then filled by depositing the nanocomposite-ink.

The releasing agent is preferably used when the nanocomposite-ink and the mold material will likely bond or stick due to structural or chemical properties. Releasing agents include silicon-based agents, waxes, sodium dodecyl sulfide, fluorocarbons, and other such organic and inorganic real leasing agents. Such releasing agents can be deposited via printing, aerosol, or dip coat. For areas in which a bond is desirable, for instance when parts of the mold will become integrated within the optical-element, the areas should be masked off or the releasing agent deposited deterministically.

In general, the nanocomposite-ink can be deposited by any deterministic deposition process. A preferred deposition technique is material printing. Material printing allows controlled deposition of the nanocomposite-ink. The nanocomposite-ink can be deposited after the mold is complete or simultaneous with the mold printing. For instance, the mold can be manufactured with an open cavity and then filled with the nanocomposite-ink. Alternatively, the mold can be manufactured in layers with the nanocomposite-ink deposited simultaneously in each or successive layers. Printing the nanocomposite-ink is describe in further detail below.

FIG. 1A schematically illustrates an ink-jet printing apparatus 10 for manufacture of optical-elements in accordance with the present disclosure. Printing apparatus 10 is simplified for explanatory purposes. Those skilled in the art will generally recognize the ink-jet printing approach, see Richard Chartoff et al., "Functionally Graded Polymer Matrix Nano-Composites by Solid Freeform Fabrication," presented at the 2003 Solid Freeform (SFF) symposium and Richard Chartoff et al., "Polymer Matrix Nanocomposites by Inkjet Printing" presented at the SFF symposium in 2005, both incorporated by reference in their entireties for the purpose of explaining optic ink-jet printing.

Printing apparatus 10A of FIG. 1A has a reservoir 12A and 12B that hold a nanocomposite-ink 22A and 22B, respectively. Reservoirs 22A and 22B provide a print-head 16A and 16B with nanocomposite-ink 22A and 22B via a feed-line 14A and 14B, respectively. Printing-heads 16A and 16B deposit nanocomposite-ink 22A and 22B, on a substrate 18 at particular voxels, thereby forming an optical-element in-process 20. Optical-element 20 comprises of a mold 21 being filled with the nanocomposite-ink. Voxels refer to positions in three-dimensional space. A stage 17 positions substrate 18, with respect to the printing-heads, for deposition of the nanocomposite-inks at particular voxels.

The printheads each have at least one nozzle, but preferably have multiple nozzles, each independently actuated for nanocomposite-ink dispensing. The printheads are preferably piezo actuated. Alternatively, printheads can be thermally actuated, electrostatically actuated, or make use of interrupted continuous flow. Piezo actuated printhead eject ink by a piezo element within the printhead changing shape via applied voltage. The shape change generates a pressure pulse, or acoustic wave, in the fluid, forcing ink from the nozzle in volumes of about 1 picoliter (pl) to about 10 pl for nanocomposite-inks with viscosities that are under about 10 centipoise (cP). Thermally actuated printheads quickly heat and evaporate volatile liquid, often, water, in the ink such that a bubble forms causing displacement of the ink through the nozzle. The nanocomposite-inks with about 10 cP or less, produce droplets of 0.1 pl to 100 pl. Electrostatically actuated printheads use an electrostatically driven microeletromechanical (MEMs) mechanism to impart momentum to droplets of the same general size using the nanocomposite-inks of the same general viscosity. Interrupted continuous flow heads break up a continuous ejection out a nozzle with resonant application of a force perpendicular to the flow resulting in a repeatable, predictable stream of droplets, which can range from about 1 pl to 100 pl making use of fluids with viscosities of 200 cP or less. Droplets that are not required are deflected, using air impingement or electrostatic charge selectively applied, into a recycling channel alongside trajectory of the droplets to be used. The nozzles should be located in proximity to the substrate on which the nanocomposite-ink is being printed, dependent on the deposition accuracy required. For precise deposition, the printhead should be within a centimeter or less of the substrate.

Substrate 18 can be made from a variety of materials which include glasses, metals, ceramics, and organic resins. Substrate 18 can become part of the optical-element or alternatively the optical-element and mold may be removed from the substrate. During deposition mold 21 is preferably attached to the substrate to allow for quick stage movement without losing spatial registration. For applications in which the substrate becomes part of the optical-element, the substrate may be optically transmissive, reflective, or absorptive. For example, in applications where the optical-element is optically transmissive and the substrate becomes a part of the optical-element, it is desirable for the substrate to be optically transparent.

During nanocomposite-ink deposition the ambient printing environment is preferably controlled. Nonlimiting environmental factors which influence the printing process is pressure, humidity, and temperature of the printing environment. For instance, the ambient temperature will cause shrinkage or expansion of the mold based on the coefficient of thermal expansion (CTE) of the mold material. Additionally, the ambient temperature will determine in part the viscosity of the nanocomposite-ink in both deposition and flow within the mold. The ambient pressure can be changed to allow passive release of any tramped air bubbles in the nanocomposite ink. A meniscus may form in certain areas, especially in smaller mold cavities. The ambient pressure and ambient temperature will, along with the nanocomposite-ink and mold material properties determine the shape of the meniscus.

After deposition of nanocomposite-ink from one of the printing-heads, mold 21 can be positioned with respect to a radiation source 19A for selective-curing of the nanocomposite-ink, at voxels, within mold 21. Selective-curing refers to localized radiation about voxels, activating the organic-host matrix. Activation of the organic-host matrix solidifies the nanocomposite-ink. Selective-curing means zero-curing, partial-curing, or fully-curing, which respectively means not solidifying, partially solidifying, or fully solidifying the nanocomposite-ink. Another radiation source 19B flood cures the nanocomposite-ink within the mold. Flood curing is desirable when the all the nanocomposite-ink needs to be partially or fully cured.

Figure 1B:
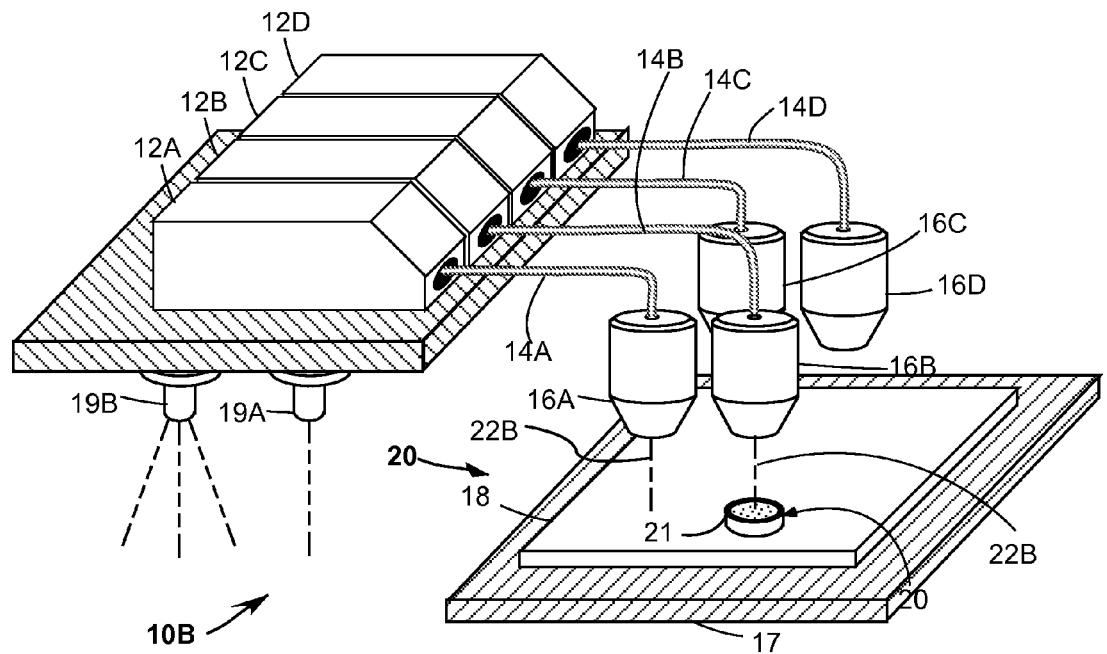
FIG. 1B is a perspective view schematically illustrating a four-head optical printing apparatus for manufacture of an optical-.

FIG. 1B illustrate printing apparatus 10B similar to that shown in FIG. 1A with an additional reservoir 12C and 12D, holding a nanocomposite-ink 22C and 22D, a feed-line 14C and 14D, and a printing head 16C and 16D. The additional printing heads provide additional nanocomposite-ink different from the nanocomposite-ink in other printing heads.

FIG. 2A through FIG. 2H illustrate various deposition techniques and in particular exemplify formation of refractive-gradients within optical-element. Such techniques can be utilized for mixing nanocomposite-ink within the mold. While such techniques are exemplified, mixing of the nanocomposite-ink can be performed such that the mold is filled with optically uniform material.

Figure 2A:
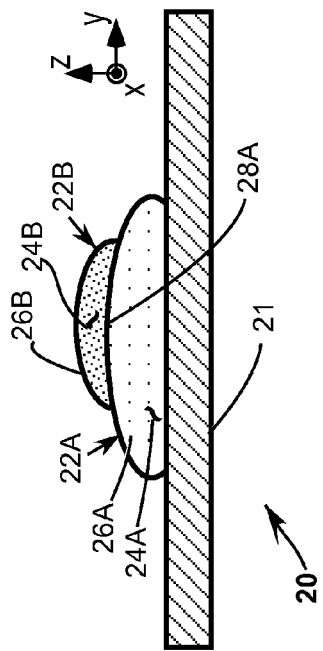

FIG. 2A schematically illustrate further detail of the optical-element in-process 22B shown in FIG. 1A. Nanocomposite-ink 22A, deposited within mold 21 is bounded by a nanocomposite-air interface 26A. The nanocomposite-ink consists of an organic-matrix with a dispersed nanofillers 24A throughout the organic-matrix.

The organic matrix is inkjet printable, optically clear, photo-curable resin. Four non-limiting examples of suitable organic-matrix material are polyacrylate, hexanediol diacrylate (HDODA), polymethyl methacrylate (PMMA), diethylene glycol diacrylate (DEGDA) and SU-8. The nanofillers are nanoparticles sufficiently small with respect to light wavelengths, for those wavelengths the optical element is intended for use, not to scatter the light. The nanocomposite-ink can be different by the nanofiller type, the organic-host matrix type, or concentration of nanofillers and combinations thereof. Non-limiting examples of nanofillers include beryllium oxide (BeO), aluminum nitride (AlO), silicon carbide (SiC), zinc oxide (ZnO), zinc sulfide (ZnS), zirconium oxide (ZrO), yttrium orthovanadate (YVO4), titanium oxide ($TiO_2$), copper sulfide ($CuS_2$), cadmium selenide (CdSe), lead sulfide (PbS), molybdenum disulfide ($MoS_2$) and silicon dioxide ($SiO_2$), including those with core, core-shell, and core-shell-ligand architectures. Optical-dispersion of the nanocomposite-ink depends on the organic-matrix and the nanofillers.

Figure 2B:
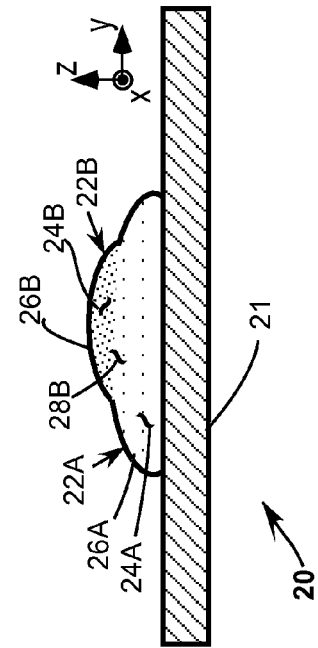
FIG. 2B is a cross-section view, schematically illustrating that shown in FIG. 2A, further including a second nanocomposite-ink deposit.

FIG. 2B schematically illustrate further detail of optical-element in-process 20 shown in FIG. 2A with additional deposit of a nanocomposite-ink 22B at a voxel above the voxel of nanocomposite-ink 22A. Here, a nanocomposite-ink 22B is shown after deposition, characterized by a dispersed nanofillers 26B, an ink-ink interface 28A (where mixing between nanoparticle-inks has not yet occurred), and an air-ink interface 26B.

Figure 2C:
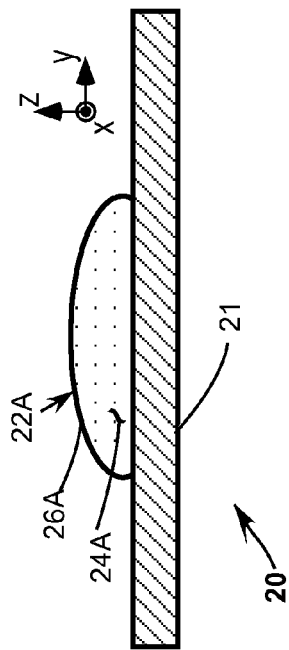
FIG. 2C is a cross-section view, schematically illustrating a resultant nanocomposite from the diffusion or convective mixing of nanofillers from the first and the second nanocomposite-ink as shown in FIG. 2B.

FIG. 2C schematically illustrates the optical-element in-process 20, as that shown in FIG. 2B, wherein the selective-curing of nanocomposite-ink 22A before deposition of nanocomposite-ink 22B was zero-curing. Nanocomposite-ink 30 is the resultant mixture of uncured nanocomposite-ink 22A and 22B. Nanocomposite-ink 30 is characterized by an air-ink interface 32 and nanofillers 24A and 24B dispersed within. A refractive-gradient between the top and bottom of nanocomposite-ink 30 depends on convective mixing resulting from relative size, velocities, and nanofiller concentrations between the nanocomposite-inks, any partial-curing of nanocomposite-ink 22A drop before deposition of nanocomposite-ink 22B, the temperature of the substrate, and time allowed for diffusion of nanofillers from nanocomposite-inks 22A and 22B, before additional partial-curing of the nanocomposite-inks.

Figure 2D:
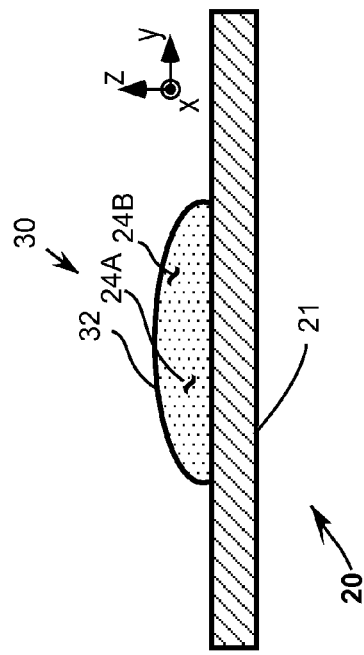
FIG. 2D is a cross-section view, schematically illustrating a resultant refractive-gradient between the first nanocomposite-ink and second nanocomposite-ink from diffusion of nanofillers of the first and second nanocomposite-inks, where the first nanocomposite was partially cured before deposition of the second nanocomposite.

FIG. 2D schematically illustrates the optical-element in-process 20, as that shown in FIG. 2B, wherein nanocomposite 22A was partially cured. Here, partial-cure of nanocomposite 22A results in gradient-area 22B between nanocomposite 22A and 22B. The extent of gradient-area 22B depends on the selective-cure of nanocomposite-ink 22A. Zero-curing allows mixture of the nanocomposite-inks as exemplified in FIG. 2C. Partial-curing allows diffusion in a limited gradient area 28A as exemplified in FIG. 3D. Fully-curing allows little diffusion and results in a substantially ink-ink interface 28A as exemplified in FIG. 2B. In addition to controlling gradient-areas, partial-curing before subsequent deposition reduces stress and strain in the resultant optical-element.

Figure 2F:
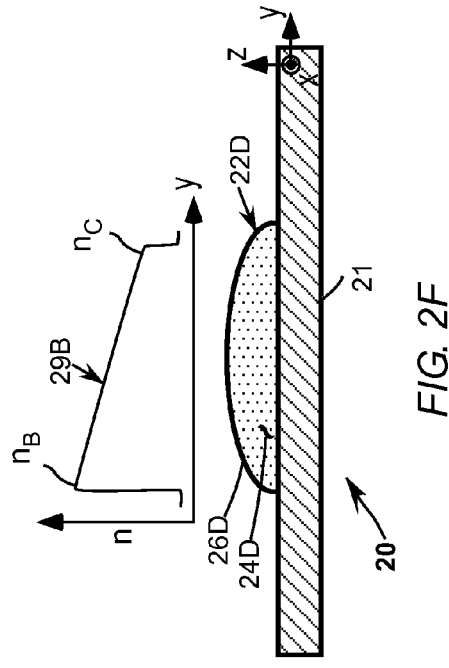
FIG. 2F is a cross-section view, schematically illustrating that shown in FIG. 2E, where the nanocomposite-ink mixing resulted in a slow transition in the refractive-gradient profile.
Figure 2E:
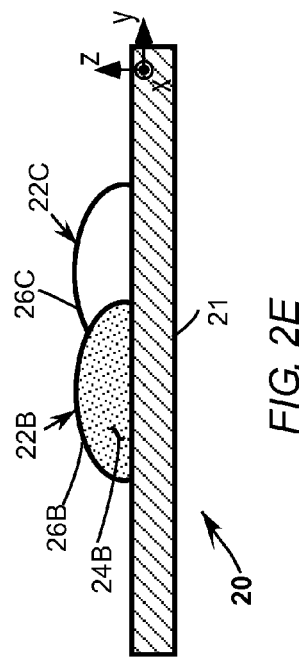
FIG. 2E is a cross-section view, schematically illustrating deposition of the nanocomposite-ink side-by-side.

FIG. 2E schematically illustrates optical-element in-process 20 shown in FIG. 1A where the nanocomposite-ink is deposited side-by-side. Here, nanocomposite-ink 22B with nanofillers 24B and ink-air interface 26B is deposited along the side of a nanocomposite-ink 22C. Nanocomposite-ink 22C has no nanofillers bound by air-interface 26C.

FIG. 2F schematically illustrates optical-element in-process 20 as shown in FIG. 2E, where nanocomposite-ink 22B has mixed with nanocomposite 22C resulting in a gradient nanocomposite 22D. Here nanocomposite 22D is bound by an ink-air interface 26D, has a nanofiller 24D, the same nanofillers as nanocomposite-ink 22B distributed in a refractive-gradient profile 29B. The gradient is a result of mixture of the nanocomposites where the partial-curing of nanocomposite 22B was minimal and aforementioned convective mixing and time was allowed before further partial-curing. A refractive-gradient profile 29B is characterized by a high refractive-index nB, the high refractive-index due to higher concentration of nanoparticles 24D, the refractive-gradient's refractive-index slowly and smoothly transitioning in the y-direction to a low refractive-index nc, the low refractive-index due to the low concentration of nanoparticles 24D.

Figure 2H:
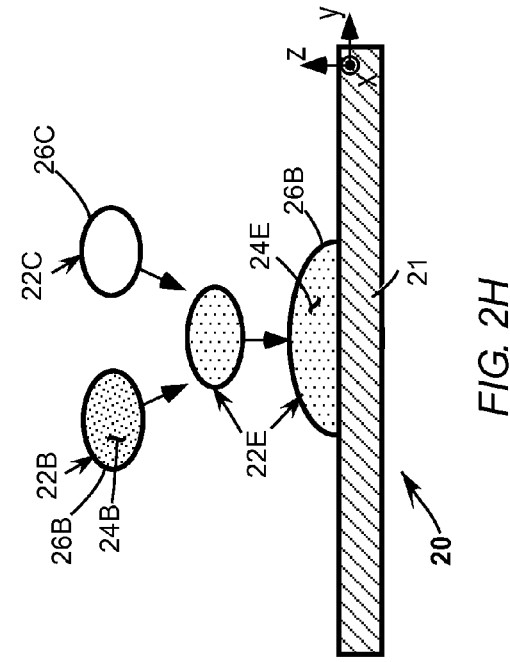
FIG. 2H is a cross-section view, schematically illustrating mixing of the nanocomposite-inks in air.
Figure 2G:
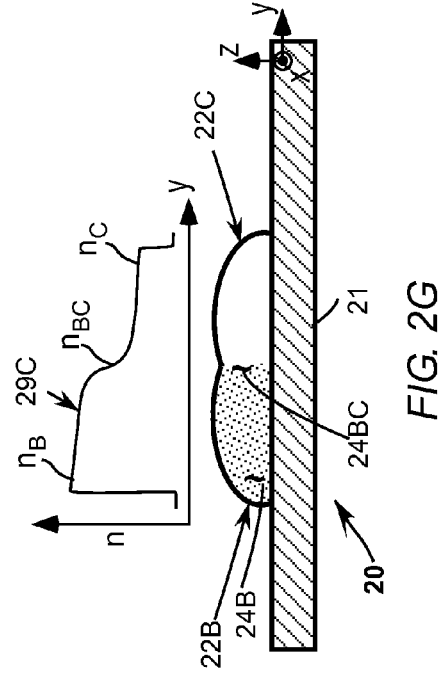
FIG. 2G is a cross-section view, schematically illustrating that shown in FIG. 2E, where the nanocomposite-ink mixing resulted in a fast transition in the refractive-gradient profile.

FIG. 2G schematically illustrates optical-element in-process 20 as shown in FIG. 2E, where nanocomposite-ink 22B has been partially-cured before deposition of nanocomposite-ink 22C. Here partial-cure of nanocomposite-ink 22B, results in limited mixing of nanocomposite-ink 22C at interface 24AB, resulting in a refractive-gradient 29C. Refractive-gradient profile 29C is characterized by a high refractive-index nB, the high refractive-index due to higher concentration of nanoparticles 24D, the refractive-gradient's refractive-index unchanging in the y-direction until quickly transitioning to a low refractive index nB at a former interface 24AB. Alternatively, refractive-gradient profile 29C could be obtained by without partial-curing of nanocomposite-ink 22B before deposition of nanocomposite 22C, by limiting the aforementioned mixing factors, such as controlling nanocomposite-ink deposition velocities, and limiting diffusion temperature control of the substrate, and curing the deposited nanocomposite-inks within a controlled time.

FIG. 2H schematically illustrates another nanocomposite-ink mixing method. Nanocomposite-ink 26B and nanocomposite-ink 26C are deposited such that the respective printing heads are aligned to cause the nanocomposite-ink to mix in air creating a nanocomposite-ink 22E. Nanocomposite-ink 22E, then deposits, mixed, within mold 21 with a nanofiller 24E bounded by an ink-air interface 26B.

The aforementioned deposition techniques allow refractive-gradients to be formed with the optical-element. Such gradients allow reduced number of curved interfaces, reduction of chromatic aberration and geometric aberrations.

Some nonlimiting geometric-aberrations include spherical aberration, coma, astigmatism, curvature of field, and distortion, known as Seidel aberrations. Spherical aberration is characterized by on-axis defocus. Coma is characterized by defocus of off-axis field-points. Astigmatism is characterized by asymmetric power in transverse planes to the optical-axis. Curvature of field is characterized by focus on a curved surface rather than a preferred planar surface. Distortion is characterized by nonlinear power as function of distance from the optical-axis, resulting in pincushion or barrel distortion. As aforementioned, the disclosed technique allows for complex refractive-gradient profiles that can correct for, in addition to chromatic aberration, those geometric-aberrations listed and combinations thereof. Further, geometric-aberrations of the substrate of the optical-element can be measured, before deposition of nanocomposite-ink, and corrected in the final optical-element by altering the gradient-index of the optical-element to correct for the geometric-aberrations measured.

A variety of techniques can be used to measure geometric-aberration. For a constant refractive-index optic, geometric-aberration can be determined with knowledge of the optic surfaces and material. The material of the optic is generally known or can be determined. Inexpensive methods include reflective and transmission spectrometry or refractometry, which are well known techniques in the art. Such techniques can be performed intermittently during the deposition process by external or in-situ. For instance, when manufacturing a transmissive lens, a light source and camera can be positioned for reflective or transmissive measurements during nanocomposite-ink deposition. Detailed element material analysis can be accomplished with scanning electron microscopy, x-ray spectrometry, and other advanced techniques. Surface properties can be measured using interferometry, profilometery, and other related techniques. Instruments capable of measuring those geometric aberrations aforementioned as well as others are commercially available from optical metrology companies such as ZYGO Corporation, of Middlefield, Conn.

In addition to the nanocomposite-ink, the additive printing or nanocomposite printing can include opaque materials such as metal-based or carbon ink, which can be thermally and electrically conductive. Such inks can be implemented in the optical-element for spatial filtering, or provide thermal or electrical paths within the optical-element. Metal-based inks and deposition process is described in U.S. application Ser. No. 14/307,071 filed on Jun. 17, 2014, assigned to the assignee of the present disclosure and hereby incorporated by reference in its entirety.

Figure 3A:
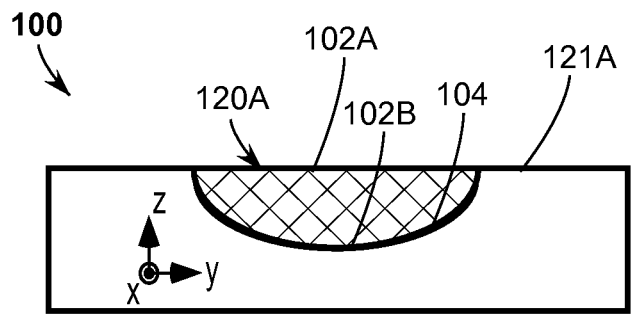
FIG. 3A is a cross-section view schematically illustrating the optical-element in the mold.
Figure 3B:
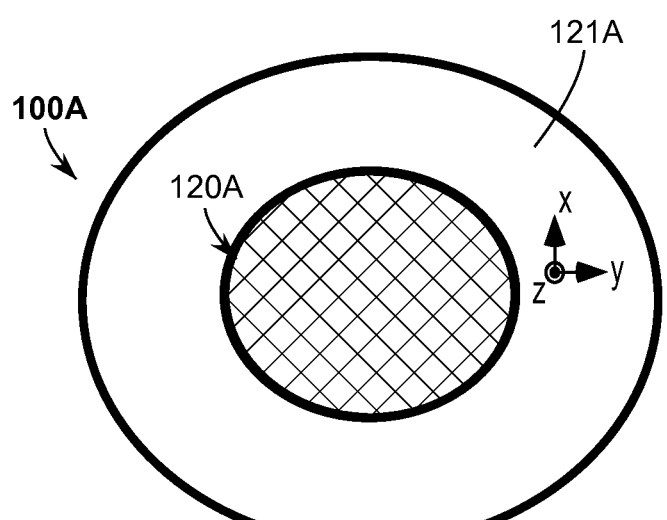
FIG. 3B is a plan view of that shown in FIG. 3A
Figure 3C:
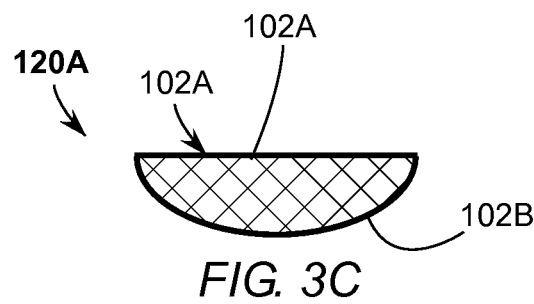
FIG. 3C is a cross-section view schematically illustrating the optical element out of the mold.

FIG. 3A, and FIG. 3B illustrate an optical-element in mold 100. FIG. 3C illustrates an optical element 120A with a mold 121A removed. Optical-element in mold 100 has optical-element 121 and mold 120. Here, the optical-element is a simple plano-convex lens with a plano surface 102A and a convex surface 102B. Convex surface 102B can be any surface shape including spherical and aspherical. Mold 121A has curvature at a nanocomposite-mold interface 104, causing nanocomposite-ink to conform to the mold curvature, resulting in optical-element 121 retaining the curvature of the mold interface upon removal. The plano surface in the mold may be formed by 3D printing, optical inserts, or figuring.

FIG. 4A and FIG. 4B illustrate an optical-element in mold 100B. Optical-element in mold 100B is the generally the same as that shown in FIG. 3A and FIG. 3B, except here, a flange 106 is included along the perimeter the optical element. Inclusion of the flange allows mounting of the optical-element in similar fashion to commercially available collimator and asphere optics. The flange thickness can be adjusted based on the standoff distance required in any apparatus in which it is installed. Flange 106 also has an optional alignment feature 108, here the alignment feature is an indent which allows the optic to be rotationally registered. Such alignment features are especially useful for optics which are not rotationally symmetric in optical power, shape, or other such properties.

FIG. 4C and FIG. 4D illustrate an optical-element in mold 100C. Optical-element in mold 100C is the generally the same as that shown in FIG. 3A and FIG. 3B, except here further comprise a tab 109A and 109B, each have a thru-hole 108A and 108B respectively. The tabs and thru-holes allow mechanical fastening of the optical-element to another apparatus and act as alignment features.

Figure 5A:
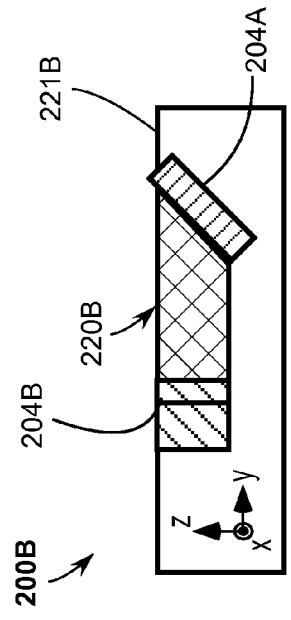
FIG. 5A is a cross-section view schematically illustrating a macro waveguide optical element wherein the optical-element has two total internal reflection (TIR) surfaces.
Figure 5C:
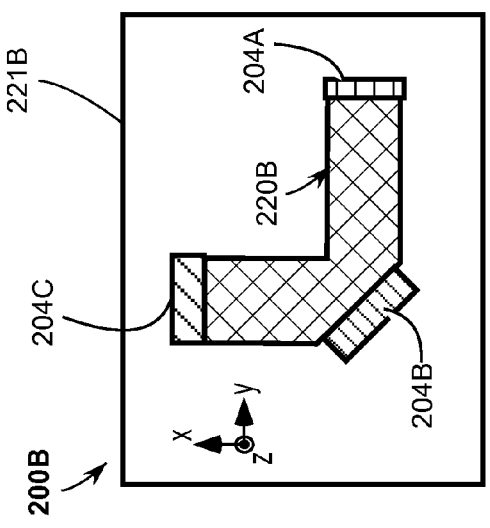
FIG. 5C is a cross-section view of the optical element shown in FIG. 5A wherein the mold incorporates a plurality of optical inserts.
Figure 5B:
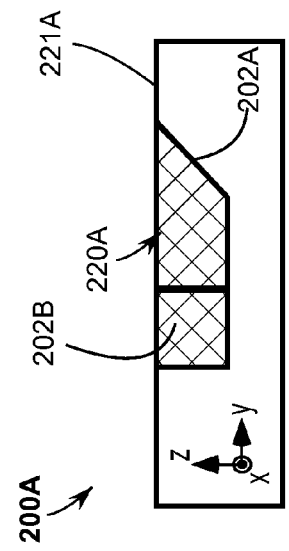
FIG. 5B is a plan view of that shown in FIG. 5A.
Figure 5D:
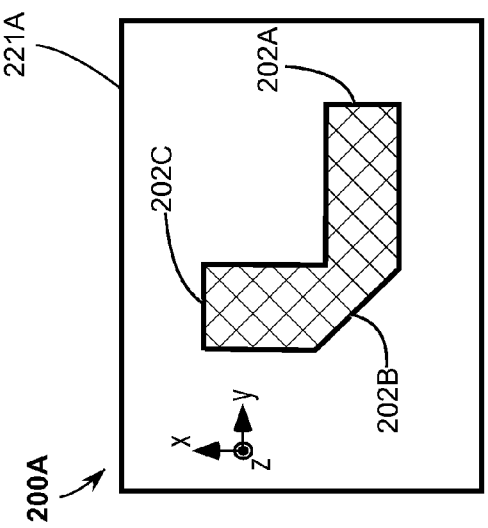
FIG. 5D is a plan view of that shown in FIG. 5C

FIG. 5A and FIG. 5B illustrate an optical-element in mold 200A. Here, an optical element 220A is a macro-sized waveguide with a total-internal-reflection surface 202A, 202B, and 202C formed by a mold 221A. Although planar surfaces are shown, such surfaces could be shaped or otherwise have patterning as describe above. FIG. 5C and FIG. 5D illustrate an optical-element in mold 200B. Optical-element in mold 200B is similar to that shown in FIG. 5A and FIG. 5B except here, an optical insert 204A, 204B, and 204C are integrated within a mold 221B such that a surface 202A, 202B, and 202C conform to the shape of the optical-inserts upon deposition and cure of the nanocomposite-ink. Another method of obtaining the desired surfaces is integration of optics. For instance, if all the optical surfaces are planar, then optical-windows can be inserted within the mold such that they form the optical surfaces with the nanocomposite-ink conforming to and bonding with the optical-windows.

The above describe embodiments have a variety of useful applications. In general, the method can be utilized to manufacture any optical-element, whether a single element or complex multi-element design. The method is particularly useful for fast prototyping and volume manufacture of optical elements.

From the description of the present disclosure provided herein one skilled in the art can design the optical-elements in accordance with the present invention. For example, one skilled in the art could design an optical-element describing the nanocomposite-ink dispersion or GRIN material by using commercially available optical design software, such as ZEMAX available from the Zemax Corporation, of Belleview, Wash. Once the optical-element is designed or a known optic is to be replicated, then the mold can be designed in commercially available 3D computer aided design (CAD) software, such as Solidworks available from Dassault Systems Corporation, of Waltham, Mass. The mold can be printed on any commercially available 3D printer and the nanocomposite-ink can be deposited within and cured as described in detail above.

Those skilled in the art to which the present disclosure pertains will recognize that while above-described embodiments of the inventive optical-element and method of manufacture are exemplified using particular surface and refractive profiles, and materials, others may be combined using these embodiments without departing from the spirit and scope of the present disclosure.

While some of the embodiments explained above and assume symmetry about the optical-axis, one skilled in the art will recognize that radial symmetry is not a requirement, cylindrical, freeform, and multi-element optical-elements can be implemented with the disclosed techniques. In summary, the present invention is described above in terms of particular embodiments. The invention, however, is not limited to the embodiments described and depicted herein. Rather, the invention is limited only by the claims appended hereto.

What is claimed is:

1. A method of manufacturing an optical-element by 3D additive printing, the steps comprising:
    (a) printing at least a part of a mold via additive manufacturing technology;
    (b) depositing a nanocomposite-ink at one or more voxels within the mold;
    (c) selectively curing the deposited nanocomposite-ink; and,
    (d) repeating at least steps (b) through (c) until the mold is filled and cured.

2. The method of claim 1 wherein the mold is made from a plastic.

3. The method of claim 1, wherein the mold incorporates mounting features.

4. The method of claim 1, wherein the mold incorporates an alignment feature.

5. The method of claim 1, wherein the mold incorporates an optical insert.

6. The method of claim 5, wherein the optical insert is incorporated within the mold after deposition of the nanocomposite-ink at one or more voxels.

7. The method of claim 5, further comprising the step of inserting the optical insert into the mold before deposition of the nanocomposite-ink.

8. The method of claim 5, wherein the optical insert is glass.

9. The method of claim 5, wherein the optical insert is incorporated as part of the optical-element.

10. The method of claim 1, further comprising the steps of applying a releasing agent to the mold before deposition of the nanocomposite-ink.

11. The method of claim 10, wherein the releasing agent is applied to confined areas within the mold.

12. The method of claim 1, wherein the mold incorporates a breakline to aid in removing least a portion of the mold.

13. The method of claim 1, further comprising the step of figuring the mold.

14. The method of 13, wherein figuring is performed with a pulsed laser, electric discharge machining (EDM), computer numerical control (CNC), stamping, polishing, or a combination thereof.

15. The method of claim 1, wherein further comprising the step of depositing another a plurality of different types of the nanocomposite-inks are used.

16. The method of claim 1, further comprising the step of removing at least a portion of the mold.

17. The method of claim 16, wherein the portion of the mold is removed with solvents.

18. The method of claim 1, wherein at least one surface of the optical-element is a total internal reflection (TIR) surface.

19. The method of claim 1, wherein the optical-element has multiple optical surfaces.

20. The method of claim 1, wherein the optical-element is at least partially a graded refractive-index (GRIN) optic.

21. The method of claim 1, wherein the optical-element is measured via in-situ metrology during printing.

22. The method of claim 1, wherein the mold has a cavity of air between two or more sections of the optical-element.

23. The method of claim 1, wherein the temperature, humidity, pressure, and combinations thereof, are controlled or modified during printing.

\* \* \* \* \*